United States Patent [19]

Vinokurov

[11] Patent Number: 5,079,934
[45] Date of Patent: Jan. 14, 1992

[54] EVAPORATIVE COOLER

[76] Inventor: Lev Vinokurov, 11 Liberial Str., Dania Haifa 4980, Israel

[21] Appl. No.: 615,062

[22] Filed: Nov. 19, 1990

Related U.S. Application Data

[63] Continuation-in-part of Ser. No. 208,588, Jun. 20, 1988, Pat. No. 4,970,876.

[30] Foreign Application Priority Data

Mar. 22, 1988 [IL] Israel .................................. 85817

[51] Int. Cl.⁵ .............................................. F28D 5/00
[52] U.S. Cl. ..................................... 62/304; 261/107; 454/157; 454/337
[58] Field of Search .............. 62/304, 309, 314, 310; 98/109, 30, 105; 261/104, 95, 107

[56] References Cited

U.S. PATENT DOCUMENTS

| | | | |
|---|---|---|---|
| 2,914,308 | 11/1959 | Bock, Jr. | 62/304 |
| 3,362,186 | 1/1968 | Patterson | 62/304 |
| 4,429,735 | 2/1984 | Nomaguchi et al. | 62/304 |

*Primary Examiner*—Albert J. Makay
*Assistant Examiner*—John Sollecito
*Attorney, Agent, or Firm*—Fulwider, Patton, Lee & Utecht

[57] ABSTRACT

The cooler apparatus includes evaporative elements which are liquid absorbent plates formed of compressed fibers defining capillary channels and pores, for drawing up water within the plates and evaporating the liquid from the surface of the plates, with a plurality of absorbent plates and contacting adjacent plates, the spacing between adjacent plates being thereby determined by the thickness of the spacer members. Another currently preferred aspect of the invention a mechanism for providing the evaporative liquid to at least an upper portion of the plurality of plates, so that this portion which typically dries out can remain uniformly wetted, to thereby prolong the life and efficiency of the absorbent plates.

9 Claims, 7 Drawing Sheets

EVAPORATIVE COOLER

BACKGROUND OF THE INVENTION

1. Related Applications

This application is a continuation-in-part of Ser. No. 07/208,588, filed June 20, 1988 now U.S. Pat. No. 4,970,876.

2. Field of the Invention

The present invention relates in general to environmental cooling apparatus, and in particular relates to evaporative coolers.

3. Description of Related Art

Systems for cooling or otherwise controlling the environment are well known. In particular, air conditioners are widely used and operate by drawing in hot air and expelling, usually into a closed environment, cool dry air.

A disadvantage of air conditioners is that although they are effective to cool the air in a closed environment to a comfortable temperature, they also substantially reduce the moisture content of the air and, as a result, persons exposed to the relatively dry air may suffer from sore throats, headaches and other related conditions. Furthermore, air conditioners are generally expensive to manufacture and run.

Distinct from air conditioners are evaporative coolers, which are most effective in hot, dry climates. Evaporative coolers, also known as desert coolers, are operative to draw in dry air, to raise significantly its moisture content and to resupply the moist air into the environment. As the moisture content of the air drawn into the cooler is raised, its temperature falls.

In one type of evaporative cooler, a blower is provided downstream of a water absorbent pad or in the "wet zone". The absorbent pads, wicks or cloths are typically made from a medium that is highly water absorbent but from which it is difficult to remove water by application of a pressure gradient thereacross, such as by an air blower. Consequently, a relatively strong air current is required to be provided across the absorbent pads in order for the water retained thereby to be released into the atmosphere. Hence, it would be desirable to provide an evaporative type of air cooler which can increase the water evaporation across the absorbent pads.

It has also been found that water absorbent pads also have a tendency to become dried out unevenly, particularly at a top portion of an absorbent pad, which can cause the pad to crack and generally deteriorate progressively with use. It would also be desirable to provide an evaporative cooler which could keep the absorbent pads continuously evenly moisturized. The present invention meets these needs.

SUMMARY OF THE INVENTION

Briefly, and in general terms, the invention provides for a cooling apparatus having improved efficiency of evaporation, and improved uniformity of wetting of absorbent, evaporation elements, for prolonged effectiveness of the evaporative characteristics of the cooling apparatus.

In a currently preferred form of the invention, the cooler apparatus includes evaporative elements which are liquid absorbent plates formed of compressed fibers defining capillary channels and pores, for drawing up water within the plates and evaporating the liquid from the surface of the plates, with a plurality of spacer members mounted on at least one side of the absorbent plates and contacting adjacent plates, the spacing between adjacent plates being thereby determined by the thickness of the spacer members.

Another currently preferred aspect of the invention is a mechanism for providing the evaporative liquid to at least an upper portion of the plurality of plates, so that this portion which typically dries out can remain uniformly wetted, to thereby prolong the life and efficiency of the absorbent plates.

These and other advantages will become apparent from the accompanying drawings, which are provided for purposes of illustration.

DETAILED DESCRIPTION OF THE INVENTION

Figure 1:
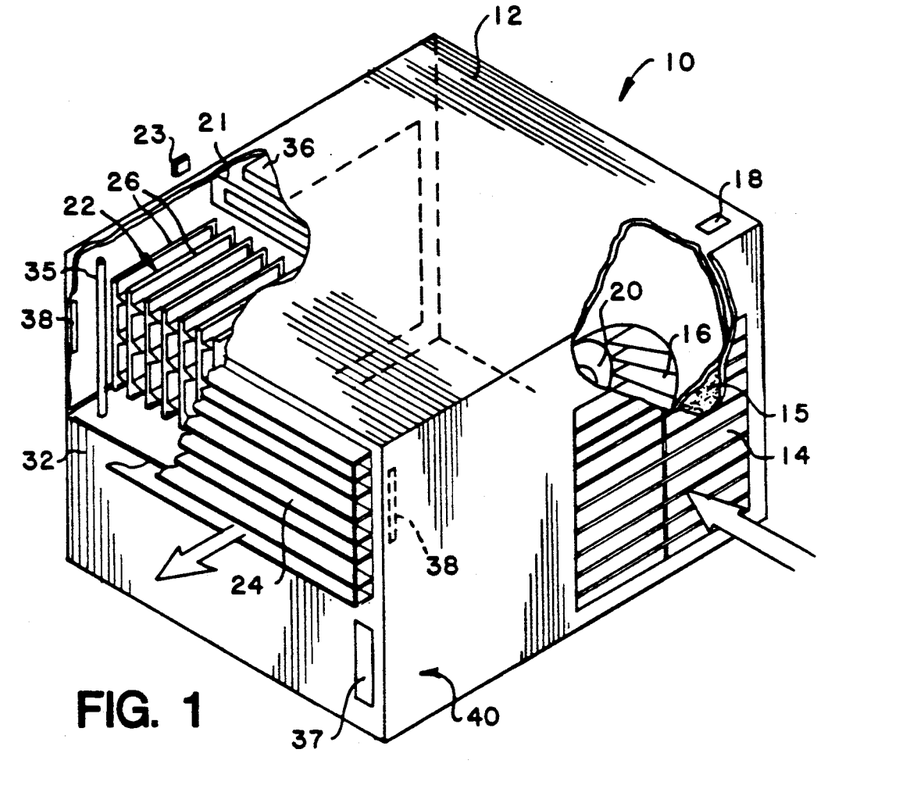
FIG. 1 is a partially cut-away perspective illustration of an evaporative cooler, constructed and operative in accordance with a preferred embodiment of the present invention.

With reference to FIG. 1, there is shown an evaporative cooler, referenced generally 10, constructed and operative in accordance with a preferred embodiment of the present invention.

Cooler 10 comprises a housing 12 which defines an air inlet 14 with which is associated air transport apparatus 16, preferably a blower, which is operated by means of a switch 18 associated with a motor 20.

Blower 16 is operative to draw air into the cooler through inlet 14 and through a filter 15 associated therewith and passes the air through a humidifying element 22, the air exiting cooler 10 through outlet grill 24. It is appreciated that cooler 10 is intended for use primarily in hot, dry environments, and is operative to raise the moisture content of the air drawn in through inlet 14 by passing the air across humidifying element 22. As the moist air passes through element 22, the increased humidity of the air causes it to be cooled and it thus exits outlet grill 24 as cool, relatively humid air.

It is appreciated that although the air passed through cooling unit 10 and being supplied thereby is cool, the high relative humidity thereof may be felt by a person in the vicinity thereof to be excessive. There is thus provided a regulator 21 which, by turning of a handle 23, is operative to permit hot, dry air drawn in to the cooling unit to be supplied directly to outlet 24, bypassing element 22. The relative humidity of the air exiting outlet 24 is, therefore, lowered to an acceptable level although the temperature of the air is raised slightly.

Figure 2:
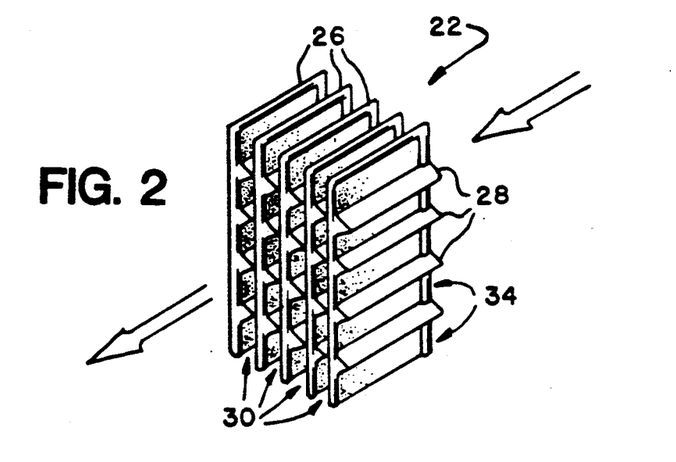
FIG. 2 is an illustration of a humidifying element useful in the cooler of FIG. 1.

With additional reference to FIG. 2, humidifying element 22 comprises a plurality of parallel plates 26 which have formed thereon a plurality of parallel spacer members 28 between the plates. The spacer members may be formed as parallel ridges on at least one face of the absorbent plates. A currently preferred form of the spacer members is of thin elongated strips of compressed glass fiber material in close fluid contact with the surface of the face of a plate, preferably adhered to the absorbent plate to be capable of transferring fluid from the one absorbent plate to an adjacent absorbent plate contacting the spacer members Plates 26 are formed of a rigid, water absorbent material Although any suitable product may be used for plates 26, the plates are preferably formed of compressed, fine glass fibers defining capillary channels throughout the absorbent plates, and surface pores. When element 22 is placed in a water reservoir 32, as shown in FIG. 1, the plates tend to draw water upward and constitute, therefore, water passageways, referenced 30.

Air passageways, referenced 34, are defined between plates 26, and intersect and communicate with water passageways 30. As air is blown across element 22 by blower 16, it is conducted along passageways 34 and causes partial evaporation of water from plates 26, the relative humidity of the air passing therethrough thus becoming very high, a typical value being 95 percent Plates 26 are spaced relatively close together Due to the constriction thus constituted by air passageways 34, the velocity of air passing therealong is increased along with a drop in air pressure. This is the well known Bernoulli effect. The increase in the velocity of the air flow and the resultant decrease in the air pressure causes an increase in the rate of evaporation of moisture from plates 26 into the air flow and a corresponding increase in the rate at which water is drawn up into the plates.

In accordance with a preferred embodiment of the invention, blower 16 is placed upstream of humidifying element 22 in the "dry" zone. This is in contrast with conventional coolers, wherein the blower is placed downstream of the humidifying element in the "wet" zone. Being located in the dry zone, blower 16 is, therefore, not subject to problems that might otherwise be caused by working in the very moist conditions of the wet zone.

Water reservoir 32 includes a water inlet 35 and there is also provided a water level gauge, referenced 37.

According to the shown embodiment, there is also provided apparatus, indicated schematically at 36, for imparting negative ions to air passing through cooler 10. The imparting of negative ions to an environment has been found to be therapeutically beneficial to persons in that environment.

Electrodes, referenced 38, associated with apparatus 36 are provided downstream of element 22 It will be appreciated that due to the very high humidity of the air passing through element 22, the dielectric constant of the air is high relative to that of dry air and that the required energy input may, therefore, be smaller than may otherwise be required.

Figure 3A:
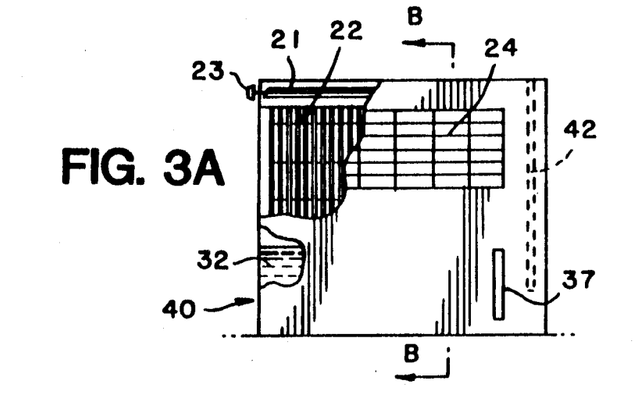
FIG. 3A is a partially cut away front elevation of an evaporative cooler, constructed in accordance with an alternative embodiment of the invention.
Figure 3B:
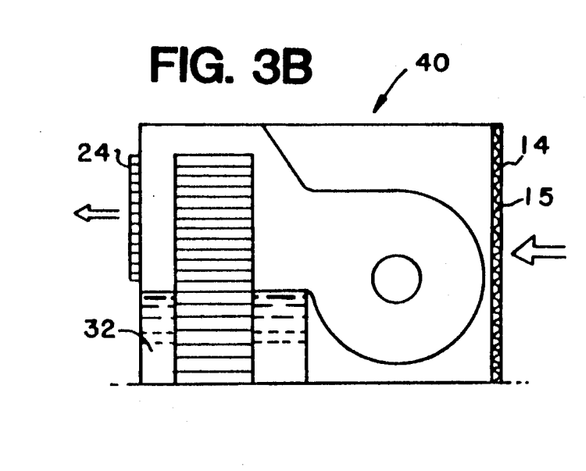
FIG. 3B is a sectional view of the cooler of FIG. A, taken along line B—B therein.

Reference is made briefly to FIGS. 3A and 3B, in which there is shown an evaporative cooler, referenced generally 40, constructed in accordance with an alternative embodiment of the invention.

Cooler 40 is generally similar to cooler 10 shown in FIG. 1. Similar components are, therefore, denoted by similar reference numerals and are not specifically described hereinbelow.

Cooler 40 is intended for permanent mounting onto a wall of any other suitable fixed surface. According to the shown embodiment, there is provided a water inlet conduit, referenced 42, by which the unit may be connected to a water supply (not shown).

It will be appreciated by persons skilled in the art, that blower 16 (FIG. 1) need not necessarily be located within housing 12 (FIG. 1). According to an alternative embodiment of the invention, blower 16 is located in an independent housing remote from housing 12 and communicates with housing 12 by way of a conduit (not shown).

According to yet a further embodiment of the invention, although a single outlet 24 is shown, cooler 40 may constitute a central cooling system for a building, such as a house or an office building, and there may be provided a plurality of similar outlets in each room of the building, a single humidifying element 22 being provided centrally or a single element being provided at each outlet.

Figure 3C:
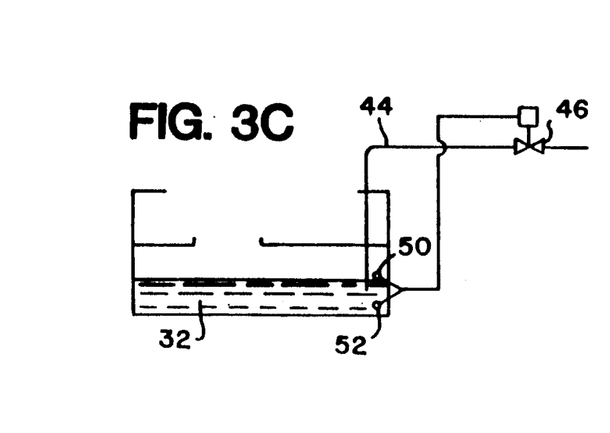
FIG. 3C is a schematic illustration of a water supply arrangement for the cooler shown in FIG. 3A.

Referring to FIG. 3C, there is shown a schematic illustration of a water supply arrangement for the cooler shown in FIG. 3A. A water supply line 44 defines an outlet associated with reservoir 32. A solenoid valve 46 located along supply line 44 communicates with first and second depth sensors, respectively referenced 50 and 52, mounted in reservoir 32.

When the water level in the reservoir reaches first sensor 50, a signal is sent to solenoid valve 46 to close. When, however, the water level falls below the second sensor 52, a signal is sent to solenoid valve 46 to open, thereby refilling the reservoir. Water is thus supplied to the reservoir until the water level reaches sensor 50, after which it is once again stopped.

Figure 3D:
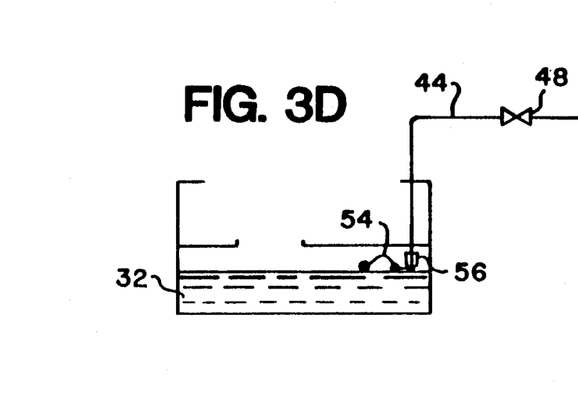
FIG. 3D is a schematic illustration of an alternative water supply arrangement for the cooler shown in FIG. 3A.

Reference is now made to FIG. 3D, in which there is shown a schematic illustration of an alternative water supply arrangement for the cooler shown in FIG. 3A. According to the shown embodiment, a valve 48 remains open continuously. There is provided a float 54, which is attached to a valve 56 provided at the outlet of supply line 44. As the water level rises, however, to a predetermined level, float 54 also rises until eventually valve 56 is closed, thereby preventing further flow of water into reservoir 32. As the water level falls, valve 56 is reopened.

Figure 3E:
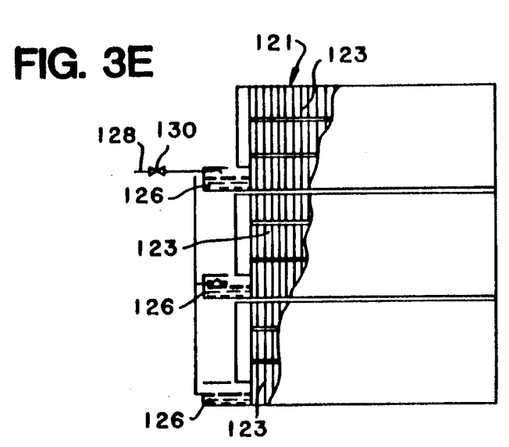
FIG. 3E is a schematic of a large-scale cooling element useful in the cooler of FIGS. 3A and 3B, and a water supply therefor.
Figure 3F:
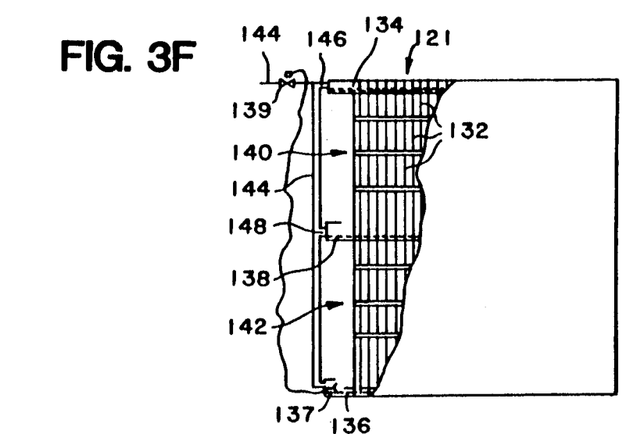
FIG. 3F is a schematic of another large-scale cooling element useful in the cooler of FIGS. 3A and 3B and a water supply therefor.

Referring now to FIGS. 3E and 3F, there are shown two alternative embodiments of coolers, similar to cooler 40, but built on a much larger scale, such as may be required for industrial purposes. According to the required output, there may be provided a large-scale humidifying element, indicated generally by reference numeral 121.

Due to the increased airflow and, therefore, evaporation of water from large-scale element 121, water has to be supplied thereto at a rate that is higher than if it were immersed in a single water reservoir, as with other, smaller-scale, embodiments of the invention. Accordingly, a number of water reservoirs are provided.

With particular reference to FIG. 3E, large-scale humidifying element 121 is composed of a plurality of modular elements 123. Elements 123 are stacked one above the other and each is partially immersed in a water reservoir 126. A water supply pipe 128 provides water to each of the reservoirs and includes a valve 130, which is operative to permit flow of water into the reservoirs when the level of water therein becomes depleted, in a fashion similar to that shown in FIG. 3D.

Referring now to FIG. 3F, large-scale humidifying element 121 comprises a single plurality of relatively tall, vertically arranged plates 132. There are provided top and bottom water reservoirs, referenced 134 and 136 respectively and an intermediate reservoir 138. As is shown, individual plates 132 pass through top and intermediate reservoirs, respectively, 134 and 138. Although gaps in reservoirs 134 and 138 through which plates 132 pass are sealed against leakage, water is still provided for absorption by plates 132 where applicable, on both sides of the reservoir. It is appreciated, therefore, that reservoir 134 is operative to supply water to an upper portion 140 of element 121 and reservoir 138 is operative to supply water both to upper portion 140 and to a lower portion 142 of element 121.

According to the shown embodiment, water is supplied by a supply pipe 144 to all three reservoirs, there being provided a sensor 137 to sense the level of water in reservoir 136, and which is operative to sense a signal to a valve 139 to open or close according to the sensed water level. There are also provided an overflow 146, communicating between upper reservoir 134 and intermediate reservoir 138 and an overflow 148, communicating between reservoir 138 and bottom reservoir 136.

It will be appreciated that in either of the arrangements shown in FIGS. 3E and 3F, the number of reservoirs and, in the case of FIG. 3E, the number of modular elements 123, is not limited to that shown and may be increased according to need.

Figure 4A:
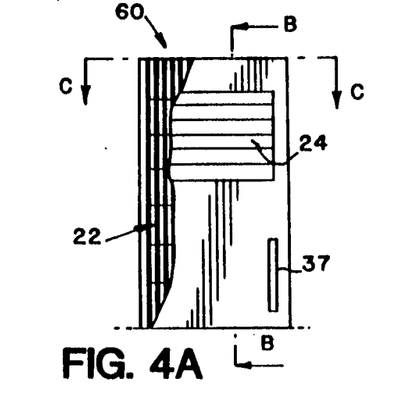
FIG. 4A is a partially cut away front elevation for an evaporative cooler, constructed in accordance with a further embodiment of the invention.
Figure 4B:
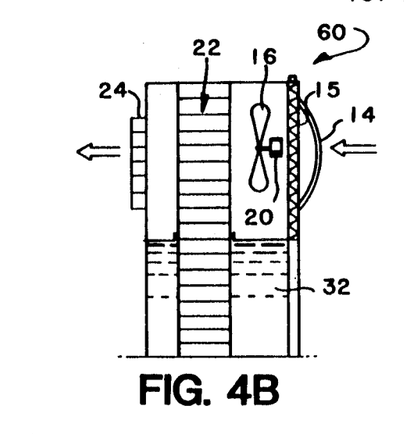
FIG. 4B is a sectional view of the cooler of FIG. A, taken along line B—B therein.
Figure 4C:
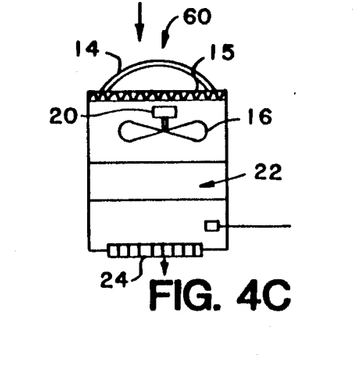
FIG. 4C is a sectional view of the cooler of FIG. 4A, taken along line C—C therein.

Reference is now made briefly to FIGS. 4A, 4B and 4C, which show an evaporative cooler, referenced generally 60, constructed in accordance with a further embodiment of the invention. Cooler 60 is generally similar to cooler 40 shown in FIGS. 3A and 3B, with the exception that it is more compact and is, therefore, intended to be portable, serving as a personal cooler. Components similar to components shown in FIGS. 3A and 3B are, it will be appreciated, denoted by similar reference numerals and are not described at length hereinbelow.

Figure 5A:
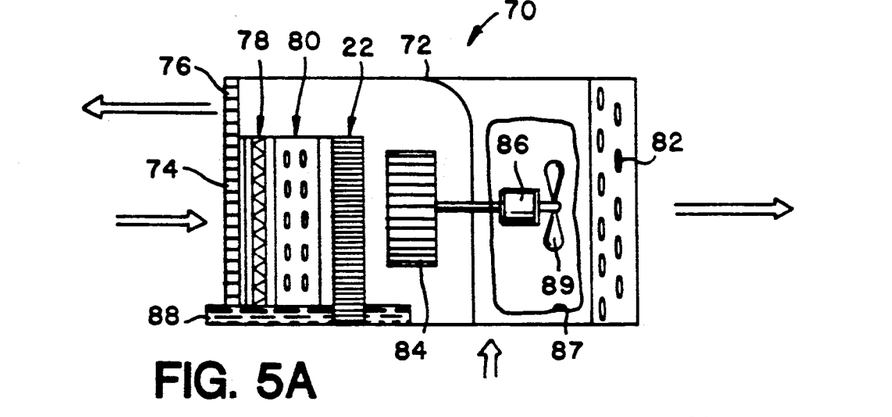
FIG. 5A is a side sectional view of a cooling unit, constructed in accordance with an alternative embodiment of the present invention.
Figure 5B:
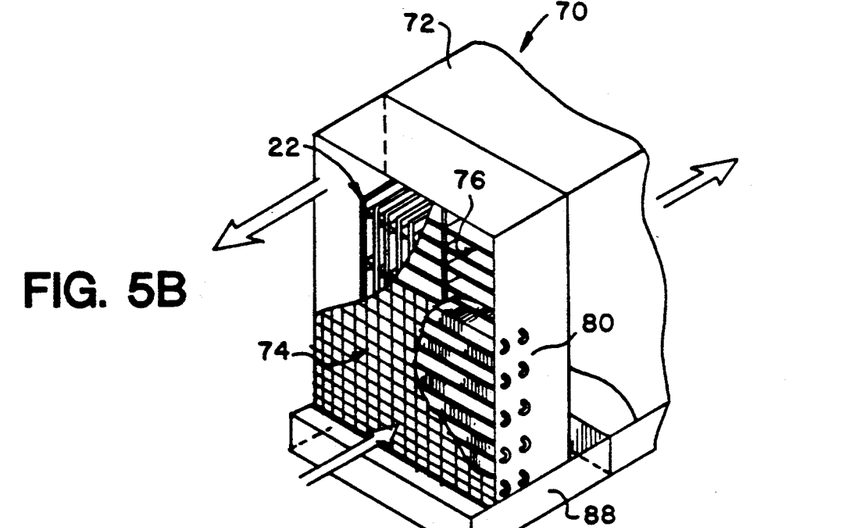
FIG. 5B is a partially cut-away, partial perspective view of a front portion of the cooling unit of FIG. 5A.

Reference is now made to FIGS. 5A and 5B, in which there is shown a cooling unit, referenced generally 70, constructed in accordance with an alternative embodiment of the present invention. Cooling unit 70 comprises a housing 72 having an air inlet 74 and an air outlet 76.

Downstream of inlet 74 there is provided a filter 78. Adjacent filter 78 and upstream of humidifying element 22 (as shown in FIG. 2 and as described above in detail in conjunction therewith) there is provided an evaporator 80, which forms part of an air conditioning unit. Evaporator 80 is operative to communicate (by means not shown) with a condenser 82. A compressor is shown at 87.

A blower 84, powered by means of a motor 86, is operative to draw air in through inlet 74. As the air is circulated across evaporator 80 and, therefore, cooled, moisture condensing on the surface of the evaporator is collected in reservoir 88. Humidifying element 22 is immersed in the water collected in reservoir 88 and, therefore, as the air, having been cooled by circulation over evaporator 80, passes through element 22 its relative humidity is substantially raised prior to being recirculated through outlet 76. A fan 89 is provided to cool condenser 82 by circulating ambient air thereacross.

Figure 6A:
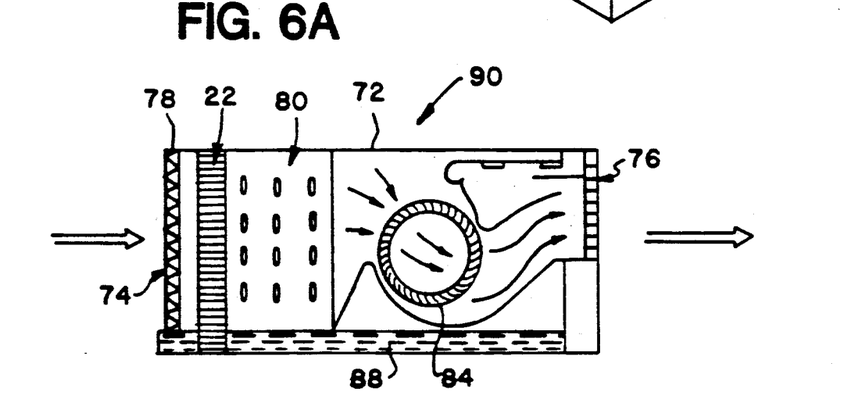
FIG. 6A is a side sectional view of a cooling unit, constructed in accordance with an additional embodiment of the present invention.
Figure 6B:
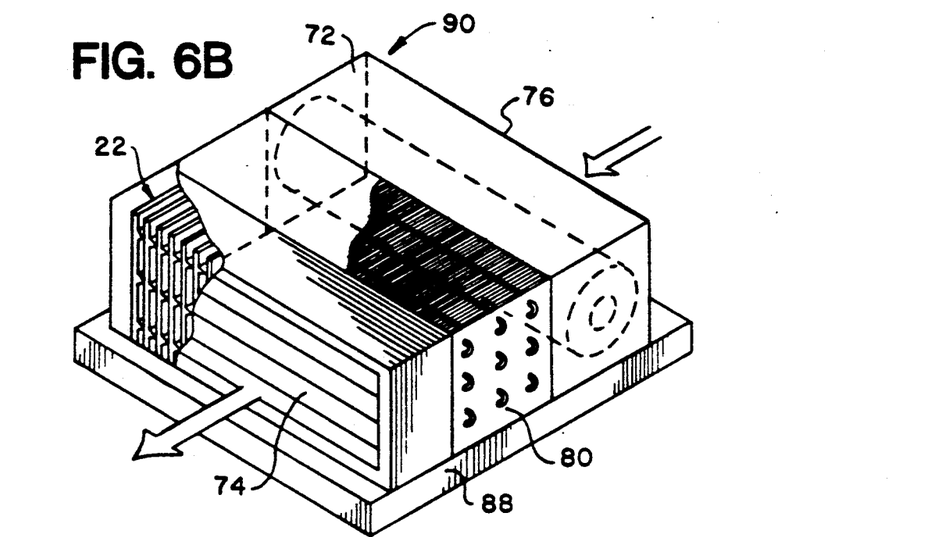
FIG. 6B is a partially cut-away, partial perspective view of a front portion of a cooling unit similar to that of FIG. 6A.

Reference is now made to FIGS. 6A and 6B, in which there is shown a cooling unit, referenced generally 90, constructed in accordance with yet a further embodiment of the present invention Cooling unit 90 is generally similar to cooling unit 70 shown in FIGS. 5A and 5B. Similar components are, therefore, denoted by similar reference numerals and are not described at length hereinbelow. Condenser 82, compressor 87 and fan 89 (as shown in the embodiment of FIGS. 5A and 5B) are not shown in FIGS. 6A and 6B as the cooling unit shown therein forms one portion of a portable split air conditioner, the shown portion and the portions not shown generally being located remotely from each other and connected by means of conduits.

It will be appreciated that, while the coolers shown in FIGS. 6A and 6B are generally similar, in the embodiment of FIG. 6A humidifying element 22 is situated upstream of evaporator 80. The air being circulated across the evaporator being, therefore, very moist Although some of the moisture condenses out as the air is circulated across evaporator 80, the cool air exiting through outlet 76 nonetheless retains a sufficiently high level of humidity so as not to cause discomfort to persons in the vicinity of the cooling unit.

In the embodiment of cooler 90 shown, however, in FIG. 6B, humidifying element is situated downstream of evaporator 80.

Figure 7:
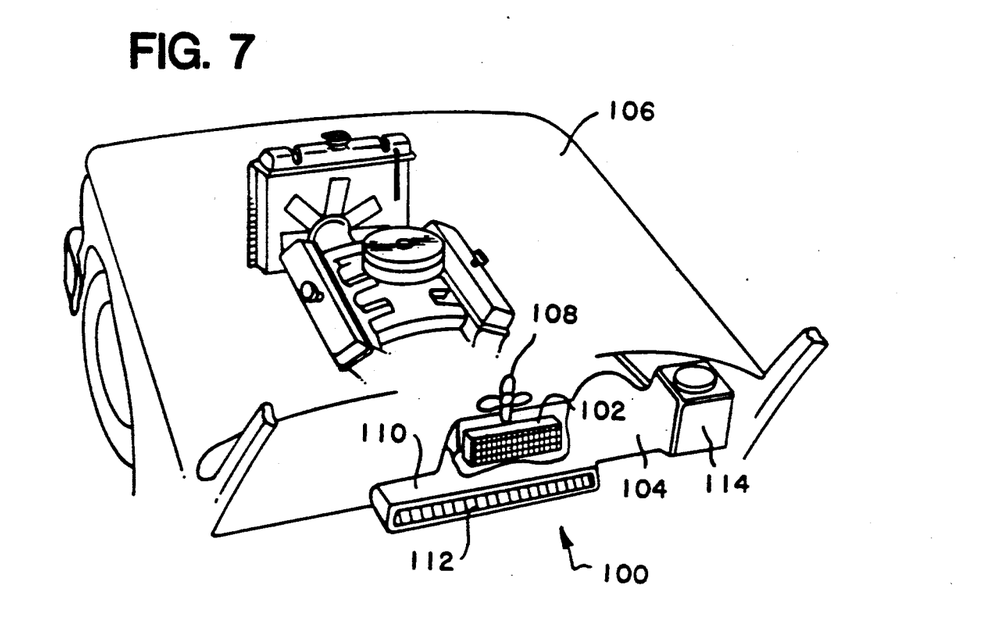
FIG. 7 is a schematic illustration of vehicle-mounted cooling apparatus, constructed and operative according to a further alternative embodiment of the invention.

Reference is now made to FIG. 7, in which there is shown a schematic illustration of vehicle-mounted cooling apparatus, referenced generally 100, constructed and operative according to a further alternative embodiment of the invention. Apparatus 100 comprises a humidifying element 102, part of which is immersed in water contained by a reservoir 104 mounted onto a vehicle 106.

According to one embodiment of the invention, a fan 108 is provided. Air is passed through element 102 and enters a housing 110 through which it exits via air ducts 112 disposed within vehicle 106.

According to an alternative embodiment of the invention, blower 108 is not provided, air flow being generated solely by the forward motion of the vehicle.

Figure 8:
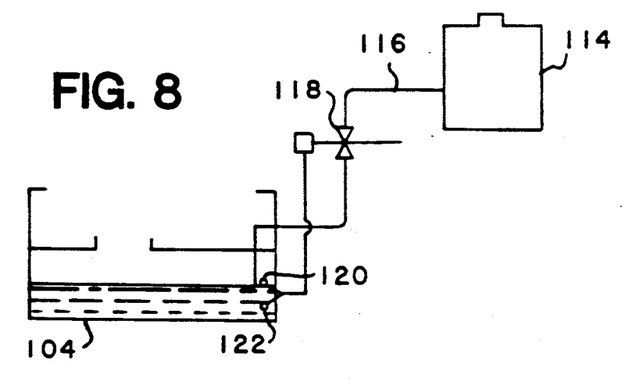
FIG. 8 is a schematic illustration of a water supply arrangement for the vehicle mounted cooling unit shown in FIG. 7.

With additional reference to FIG. 8, there is shown a schematic illustration of a water supply arrangement for vehicle-mounted cooling unit 100. There is provided a water container 114, which may be mounted in any suitable location on vehicle 106 (FIG. 7) which allows for gravitational flow of water to reservoir 104. A water conduit 116 defines an outlet in reservoir 104. A solenoid valve 118 located along conduit 116 is associated with first and second depth sensors, respectively referenced 120 and 122 mounted in reservoir 104.

When the water level in the reservoir reaches first sensor 120, a signal is sent to solenoid valve 128 t o close. When, however, the water level falls below the second sensor 122, a signal is sent to solenoid valve 118 to open, thereby refilling the reservoir. Water is thus supplied to the reservoir until the water level reaches sensor 120, after which it is once again stopped.

Figure 9:
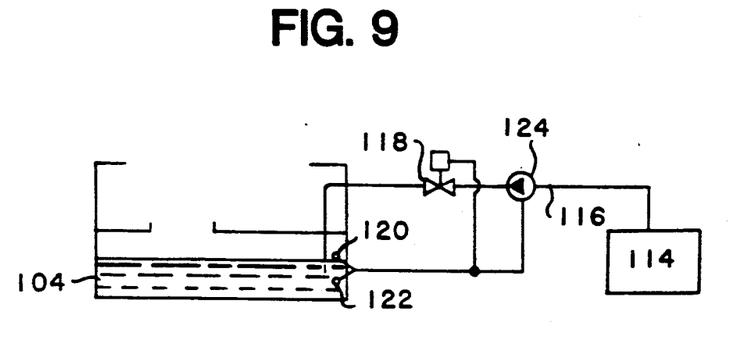
FIG. 9 is a schematic illustration of an alternative water supply arrangement for the vehicle mounted cooling unit shown in FIG. 7.

Referring briefly to FIG. 9, there is shown a water supply arrangement for vehicle-mounted cooling unit 100 which is generally similar to the arrangement shown in FIG. 8, with the exception that a pump 124 is provided and obviates the necessity of container 114 being located such that water flows therefrom to reservoir 104 under gravity.

Figure 10:
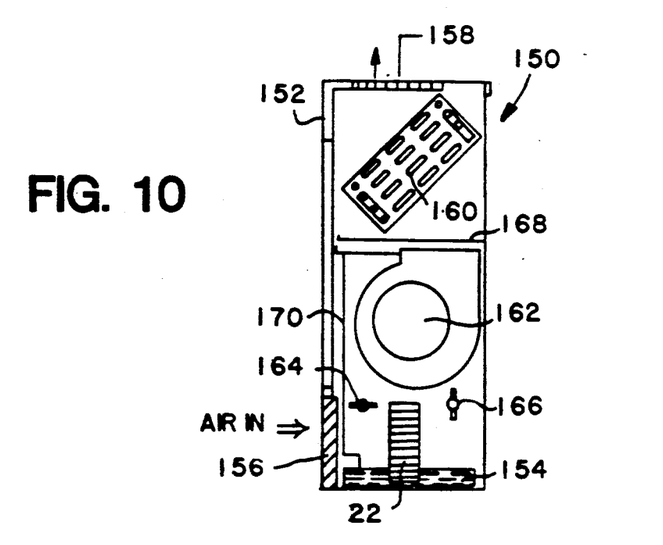
FIG. 10 shows an alternative embodiment of a cooling unit, constructed and operative in accordance with an embodiment of the invention.

Referring briefly to FIG. 10 there is shown a cooling unit, referenced 150, such as may be used in a computer room, wherein it is desirable to maintain a cool environment and wherein it may also be necessary to replenish moisture depleted from the environment due to the heat of the computers.

Unit 150 comprises a housing 152 in which are provided a humidifying element 22 (as shown and described in conjunction with FIG. 2) which is partially immersed in a water reservoir 154. The housing includes an air inlet 156 and outlet 158, adjacent to which is a cooling coil 160 of any suitable variety.

Air is drawn in through inlet 156 by means of a blower 162 and is operative to travel along either one of two pathways which may be opened and closed by means of valves 164 and 166. The valves are connected to a control unit (not shown) which is connected to a humidity sensor (not shown) typically located adjacent to inlet 156.

If the control unit senses, by means of the humidity sensor, that the air humidity is lower than a preselected value, as shown, valve 164 is closed and valve 166 is opened, such that air to be cooled passes through element 22 and, therefore, after having been cooled by cooling coil 160, exits through outlet 158 as cool, moist air.

Once, however, the sensed humidity level reaches a selected level, valve 166 is closed and valve 164 is opened, such that air bypasses element 22 on its way to being cooled. There is also provided a bath 168 to collect any condensed water that has formed on cooling coil 160, this water being resupplied to reservoir 154 by means of a substantially vertical conduit 170.

According to an alternative embodiment, water is also supplied to reservoir 154 by means of an external water supply arrangement, similar to that shown in either of FIGS. 3C or 3D.

Figure 11:
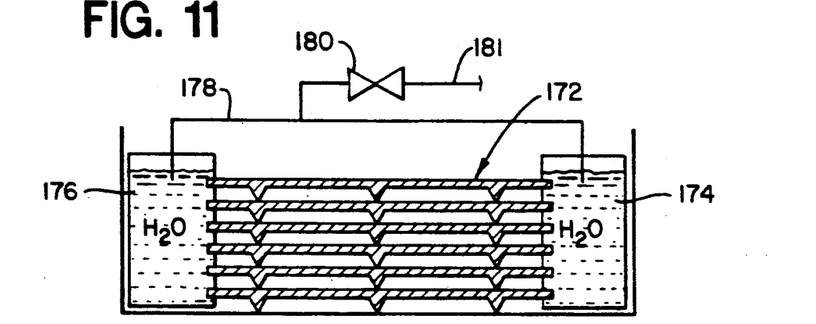
FIG. 11 is a schematic illustration of an alternative arrangement of the cooling plates horizontally between two reservoirs.
Figure 12:
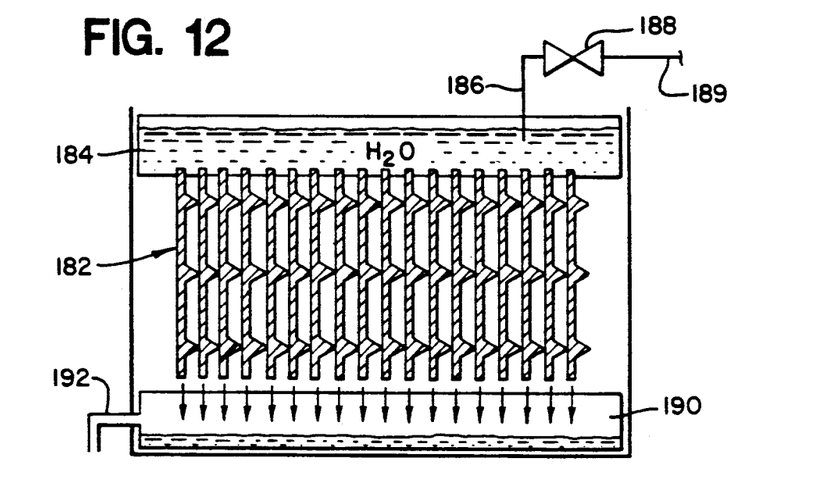
FIG. 12 is a schematic illustration of another alternative arrangement of the cooling plates vertically, supplied with liquid from above.

Now referring to FIG. 11, another embodiment of an arrangement of cooling plates for the cooling apparatus 40 involves the placement of the same absorbent plates 172 utilized in the other embodiments discussed above in a series of horizontal planes, closely packed together with the spacer elements contacting adjacent plates to define the spacing of the air pathways between the plates. The plates are suspended between a first water reservoir 174 and a second reservoir 176, such as by insertion through corresponding slots in the inner sidewalls of the reservoirs so as to continuously receive liquid water by the capillary action of the absorbent plates Liquid water is supplied to the reservoirs by a supply line 178, with the water supply being controlled by valve 180 from the water supply source 181. Sensors (not shown) are preferably provided for maintaining the water level in each of the reservoirs above the level of the upper most absorbent plate, so that liquid water is evenly distributed throughout the stacked absorbent plates. Another preferred alternative arrangement of the absorbent plates which would be suitable for a cooling apparatus 40 is illustrated in FIG. 12. In this arrangement, the absorbent plates 182 are tightly packed with the spacing of the air pathways between the plates defined by the spacer elements which contact adjacent plates, with all of the absorbent plates being suspended vertically from an upper reservoir 184. The absorbent plates may be mounted in the upper reservoir slots in the bottom wall of the reservoir to be in constant contact with liquid water in the upper reservoir. A supply line 186 provides liquid water to the reservoir, controlled by the valve 188 and the liquid water supply source 189. It will be appreciated that the capillary action of the absorbent plates will withdraw water from the upper reservoir, and will cause a certain amount of unevaporated water to drip from the bottom portions of the absorbent plates into the overflow basin 190, having an overflow port 192. The constant flow of liquid water through the vertically suspended plates provides a cleansing action which removes the higher concentrations of minerals which can be deposited upon the outer surface of the plates as the liquid water evaporates. This constant cleaning action therefore helps to insure and prolong the evaporative efficiency of the absorbent plates The constant supply of liquid water to the upper portions of the absorbent plates furthermore prevents the drying and subsequent cracking of the absorbent plates, thereby preventing degradation of the operating efficiency of the absorbent plates which can otherwise occur from the repeated moistening and drying of absorbent materials.

Figure 13:
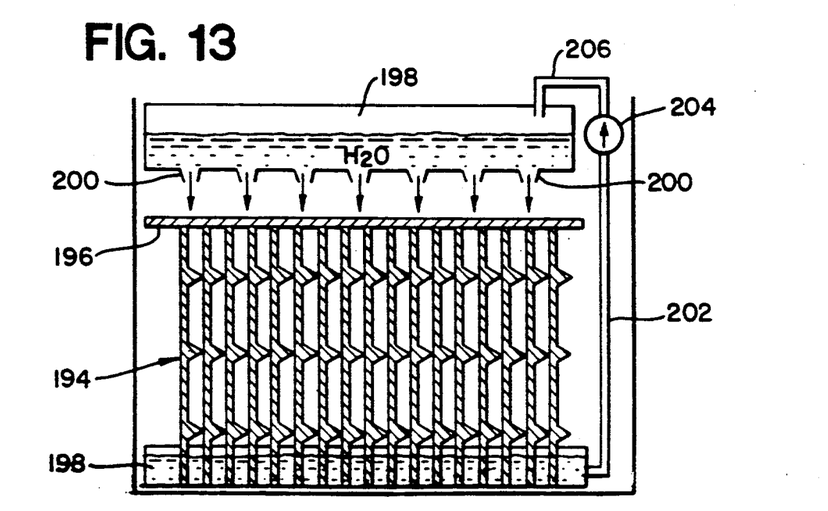
FIG. 13 is a schematic illustration of a further alternative embodiment of the cooling plates arranged vertically, supplied with liquid from above.

Referring to FIG. 13, a further alternative embodiment of a vertical placement of absorbent plates such as is suitable for a cooling apparatus 40, involve the vertical placement of the porous, fibrous absorbent plates 194 with the tight packing of the plates so that the spacer members are contacting adjacent plates, with the upper ends of the plates mounted to and in fluid communication with an upper porous block 196, preferably made of the same type of porous, fibrous material as the absorbent plates. Liquid water is supplied to the porous block by an upper reservoir 198 having several drip outlet ports 200 along its bottom wall which continuously drip water onto the porous block. The bottom portions of the vertically suspended porous plates are situated in a lower overflow basin 199, which returns the overflow liquid water through a return line 202 and overflow pump 204, through the overflow supply line 206. Thus in this embodiment, the upper portion of the absorbent plates are continuously supplied with liquid water, to provide a uniform distribution of water to the plates and to prevent drying and cracking of the plates.

It will be appreciated by persons skilled in the art that the present invention is not limited by what has been shown and described above. The scope of the invention is limited, rather, solely by the claims which follow.

What is claimed is:

1. A cooling apparatus comprising:
    a housing;
    a plurality of substantially parallel, liquid absorbent plates disposed in said housing comprising compressed fibers defining capillary channels in said plates for drawing liquid through said plates, and defining a plurality of pores in said plates in communication with said capillary channels for evaporation of liquid from said plates, said plurality of plates further defining a plurality of parallel air pathways between said plates, said plurality of air pathways intersecting and communicating with said pores;
    a plurality of porous spacer members mounted on and in fluid communication with at least one side of each of said plates and aligned parallel to a direction of air flow, said spacer members being in contact with and in fluid communication with adjacent plates for transferring liquid between said plates, the width of each of said plurality of air pathways being thereby determined by the thickness of said spacer members;
    means for supplying an evaporative liquid to at least an upper portion of said plurality of plates; and
    means for applying a pressure gradient across said plurality of parallel air pathways, said spacer plates are spaced sufficiently close together by said spacer members such that the velocity of air entering said plurality of pathways is increased and such that the air pressure therealong is decreased when a pressure gradient is applied across said pathways to thereby increase the rate of evaporation of said liquid and to withdraw said liquid from said pores.

2. The apparatus of claim 1, wherein said plates are disposed in horizontal planes in said housing and said means for supplying evaporative liquid comprises a pair of liquid reservoirs in said housing disposed on opposite sides of said plates and in fluid communication with said plates.

3. The apparatus of claim 1, wherein said means for supplying evaporative liquid comprises a liquid reservoir disposed in said housing above said upper portion of said plates and operative to drip liquid on said upper portion.

4. The apparatus of claim 3, wherein said plates are arranged in vertical planes in said housing, and said means for supplying evaporative liquid comprises an upper liquid reservoir operative to drip liquid on said upper portion of said plates.

5. The apparatus of claim 4, further including a lower reservoir situated beneath said plates and means for recycling liquid accumulating in said lower liquid reservoir to said upper liquid reservoir.

6. The apparatus of claim 1, wherein said means for applying a pressure gradient across said plates comprises air transport means having an inlet and an outlet, and wherein said plates are disposed downstream of air transport means.

7. The apparatus of claim 6, wherein said housing further includes an inlet disposed upstream of said air transport means inlet, and at least one outlet port disposed downstream of said plates.

8. The apparatus of claim 7, wherein said housing further includes outlet duct means having a plurality of outlet ports.

9. The apparatus of claim 8, wherein said cooling apparatus is mounted onto a vehicle.

* * * * *